United States Patent
Bashev et al.

(10) Patent No.: US 11,698,713 B2
(45) Date of Patent: Jul. 11, 2023

(54) METHOD, SYSTEM, AND MACHINE-READABLE DATA CARRIER FOR CONTROLLING A USER DEVICE USING A CONTEXT TOOLBAR

(71) Applicant: LIMITED LIABILITY COMPANY "PEERF", Moscow (RU)

(72) Inventors: Vladimir Nikolaevich Bashev, Nizhnij Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 40 days.

(21) Appl. No.: 16/337,492

(22) PCT Filed: Aug. 1, 2017

(86) PCT No.: PCT/RU2017/050068
§ 371 (c)(1),
(2) Date: Mar. 28, 2019

(87) PCT Pub. No.: WO2018/063036
PCT Pub. Date: Apr. 5, 2018

(65) Prior Publication Data
US 2020/0034004 A1    Jan. 30, 2020

(30) Foreign Application Priority Data
Sep. 28, 2016 (RU) .................... 2016138466

(51) Int. Cl.
*G06F 3/0482* (2013.01)
*G06F 9/451* (2018.01)
(Continued)

(52) U.S. Cl.
CPC .......... *G06F 3/0482* (2013.01); *G06F 3/0485* (2013.01); *G06F 3/0488* (2013.01); *G06F 3/04842* (2013.01); *G06F 9/451* (2018.02)

(58) Field of Classification Search
CPC .... G06F 3/0482; G06F 3/048; G06F 3/04842; G06F 3/0485; G06F 3/0488; G06F 9/451; G06F 3/04817; G06F 3/04847
See application file for complete search history.

(56) References Cited

U.S. PATENT DOCUMENTS 6,690,391 B1 * 2/2004 Proehl .................. G06F 3/0362
715/720
7,730,425 B2   6/2010 De Los Reyes
(Continued)

FOREIGN PATENT DOCUMENTS

RU    2011140845 A    5/2013

*Primary Examiner* — Tan H Tran
(74) *Attorney, Agent, or Firm* — Boyle Fredrickson S.C.

(57) ABSTRACT

The claimed invention relates to graphical user interfaces (GUI), in particular to a method for controlling devices using a multifunctional context toolbar. The technical result is to raise the operating speed of the graphical interface owing to the fact that there is no need to switch imaging modes of the graphical user interface for accessing functions of an electronic device. The claimed solution is achieved by a method for controlling functions of an electronic device using a graphical user interface, comprising steps in which: a region of a dynamic context toolbar is formed comprising a primary functional element and two additional functional elements for activating application states, wherein the centers of all three elements are on the same line; using said toolbar, user control commands are received for the current application state; application functions are distributed among said toolbar elements; at least one application function is executed by means of interaction with the primary toolbar element.

20 Claims, 9 Drawing Sheets

(51) Int. Cl.
  *G06F 3/04842* (2022.01)
  *G06F 3/0485* (2022.01)
  *G06F 3/0488* (2022.01)

(56) References Cited

U.S. PATENT DOCUMENTS

| | | | |
|---|---|---|---|
| 2010/0088654 A1 | 4/2010 | Henhoeffer | |
| 2010/0269040 A1* | 10/2010 | Lee | G06F 3/04817 |
| | | | 715/702 |
| 2010/0281374 A1 | 11/2010 | Schulz et al. | |
| 2011/0202879 A1* | 8/2011 | Stovicek | G06F 3/0482 |
| | | | 715/828 |
| 2011/0265035 A1* | 10/2011 | Lepage | G06F 3/0482 |
| | | | 715/810 |
| 2013/0019175 A1* | 1/2013 | Kotler | G06F 3/0482 |
| | | | 715/728 |
| 2013/0104079 A1* | 4/2013 | Yasui | G06F 3/0482 |
| | | | 715/834 |
| 2013/0212529 A1* | 8/2013 | Amarnath | G06F 3/017 |
| | | | 715/810 |
| 2013/0235044 A1* | 9/2013 | Kaleta | G06F 3/0484 |
| | | | 345/473 |
| 2013/0268875 A1* | 10/2013 | Han | G06F 3/0482 |
| | | | 715/769 |
| 2013/0326391 A1* | 12/2013 | Chen | G06F 3/0482 |
| | | | 715/779 |
| 2014/0189562 A1* | 7/2014 | Lee | G06F 3/04845 |
| | | | 715/771 |
| 2014/0282151 A1 | 9/2014 | Harvey | |
| 2015/0301697 A1 | 10/2015 | Petrell et al. | |
| 2016/0034127 A1* | 2/2016 | Seo | G06F 3/0486 |
| | | | 715/769 |
| 2016/0291831 A1* | 10/2016 | Baek | G06F 3/04817 |

\* cited by examiner

METHOD, SYSTEM, AND MACHINE-READABLE DATA CARRIER FOR CONTROLLING A USER DEVICE USING A CONTEXT TOOLBAR

This application is the U.S. National Phase of PCT/RU2017/050068 filed on Aug. 1, 2017, which claims priority to RU 2016138466 filed on Sep. 28, 2016, the entire contents of each of which are hereby incorporated herein by reference.

FIELD OF THE INVENTION

The claimed invention relates to Graphical User Interfaces (GUI), in particular, to a method of user device management using a multifunctional context toolbar.

BACKGROUND OF THE INVENTION

In the instant application, the term "toolbar" shall be understood to mean a tool bar being a part of the GUI and comprising a set of functions (ref. L. M. Nevdyaev, Telecommunication Technologies. English-Russian Explanatory Dictionary. "Mobile Communications". —M. 2002—592 p.).

The use of toolbars for graphical user interfaces is widely known in the prior arts; virtually every software application comprises an interface area with a toolbar having a set of application management functions.

For example, there is a method of application management using a multifunctional toolbar (US20140282151, 18 Aug. 2014), consisting in the formation of a toolbar area to display tabs, in particular, webpage or file and folder tabs. The interface management method provides for scrolling through the items in order to reach the required item in a fixed area occupying a relatively small display area, which makes its use more efficient.

The disadvantage of this approach is a reduced functionality of the toolbar limited to scrolling through toolbar items corresponding to the set of webpage tabs or another type of files, which can be represented in a catalogue form.

The problem of display workspace optimization is of particular importance when accepting incoming calls or typing text messages on touchscreen mobile phones (smartphones).

The current typical applications for answering incoming calls normally occupy the entire display area and provide a set of functions, such as: answer, decline, hold a call and answer with a text message. When accepting incoming calls in such a way, virtually the entire display workspace is occupied by the application preventing operation of other applications.

SUMMARY OF THE INVENTION

The technical problem to be solved by the claimed invention is creation of a multifunctional context toolbar providing for management of multiple functions of an electronic device, occupying the minimum display workspace and expanding the functional capabilities in terms of executing functions of one or another software application run using the claimed toolbar.

The technical result is an increased graphical interface operation speed due to no need in switching the GUI display modes to get access to device functions.

Additional technical results are context toolbar enhancement due to function allocation among active toolbar areas and implementation of a multifunctional area of generation of an additional radial interface comprising the functions of the application executed using the above toolbar, as well as reduction of the display workspace required for device function management.

The claimed solution is implemented by means of a device function management method using a graphical user interface and comprises the following stages:

creation of a dynamic context toolbar area comprising the main functional element and two supplementary functional elements of application status activation, with the centers of the three elements positioned on the same straight line;

acquisition of user control commands for the current application status using the above toolbar;

allocation of application functions among the above toolbar elements;

execution of at least one application function by interaction with the main toolbar element.

In a particular embodiment of the method, the toolbar area additionally comprises a text typing area.

In a particular embodiment of the method, the toolbar area additionally comprises an application info display area.

In a particular embodiment of the method, the display area is configured to display the application at a reduced scale.

In a particular embodiment of the method, the toolbar area is implemented with the GUI navigation option.

In a particular embodiment of the method, application functions are enabled by holding the main element for a pre-determined period of time.

In a particular embodiment of the method, application functions are enabled by holding and dragging the main element to one of additional element locations.

In a particular embodiment of the method, enabling the main element generates a radial interface displaying a set of device applications and/or functions with the option of scrolling through them in an arc-shaped trajectory with regard to the main element position.

In a particular embodiment of the method, the main element additionally comprises an area showing the executed application function status or progress.

In a particular embodiment of the method, user control commands are generated by interacting with an input device.

In a particular embodiment of the method, the input device is selected from the following group: a touchscreen, a keyboard, a mouse, a trackball or a touchpad.

Another preferred embodiment of the claimed invention is a system for electronic device functions management using a graphical user interface, comprising at least one processor at least one memory with machine-readable instructions, which, when executed by at least one processor, create a dynamic context toolbar area with the main functional element and two additional functional elements of application status activation;

provide for acquisition by the above toolbar of user control commands for application function execution;

allocate the application functions among the above toolbar elements;

provide for the execution of at least one application function via user interaction with the main toolbar element.

In a particular embodiment of the system, the toolbar area additionally comprises a text typing area.

In a particular embodiment of the system, the toolbar area additionally comprises an application info display area.

In a particular embodiment of the system, the display area is implemented with the option of downscaled application display.

In a particular embodiment of the system, the toolbar area is implemented with the GUI navigation option.

In a particular embodiment of the system, application functions are enabled by holding the main element for a pre-determined period of time.

In a particular embodiment of the system, application functions are enabled by holding and dragging the main element to one of additional element locations.

In a particular embodiment of the system, enabling the main element generates a radial interface displaying a set of device applications and/or functions with the option of scrolling through them in an arc-shaped trajectory with regard to the main element position.

In a particular embodiment of the system, the main element additionally comprises an area showing application function status or progress.

In a particular embodiment of the system, user control commands are generated by interacting with an input device.

In a particular embodiment of the system, the input device is selected from the following group: a touchscreen, a keyboard, a mouse, a trackball or a touchpad.

The third preferred embodiment of the claimed invention is a machine-readable medium comprising machine-readable instructions, which, when executed by at least one processor, execute the stages of the device function management method using the above graphical user interface.

DETAILED DESCRIPTION OF THE INVENTION

Figure 1:
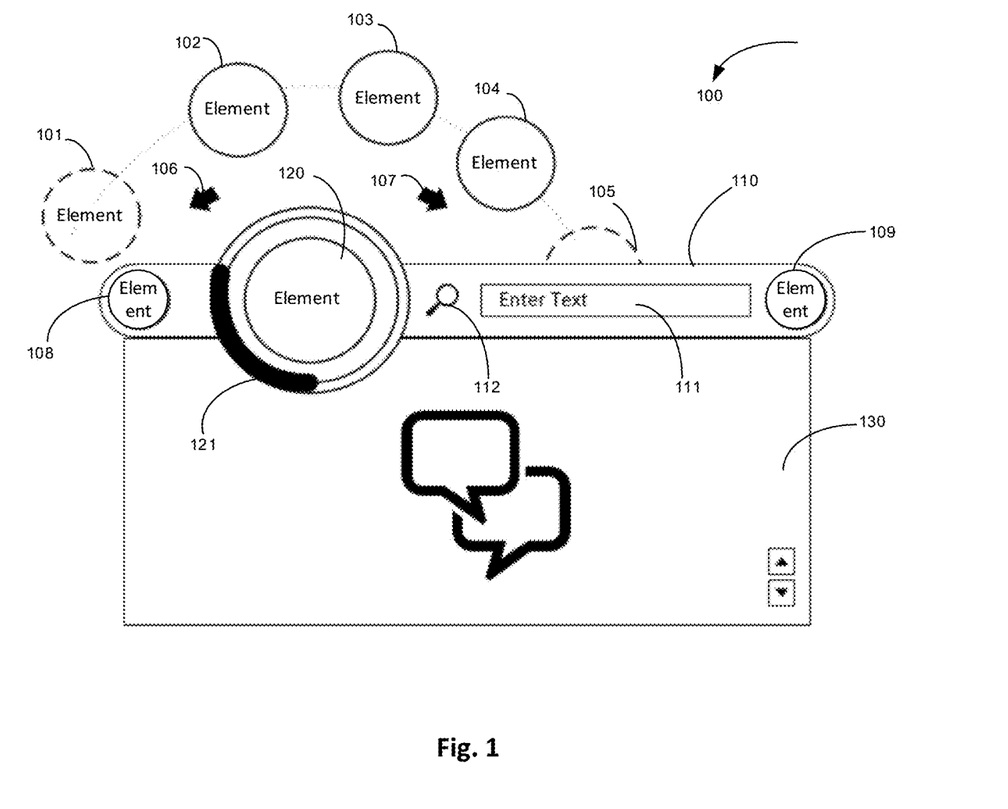
FIG. 1 shows the general appearance of the claimed toolbar.

According to FIG. 1, the claimed context toolbar (100) is an active area of a graphical user interface (GUI), occupying a certain part of display workspace and comprising a set of functional elements for execution of software applications.

The main area (110) of the toolbar (100) is a horizontal bar comprising the main functional element (120) and two additional functional elements (108, 109). The functional elements (108, 109, 120) are located in the toolbar (100) area (110) in such a way that their centers are positioned on the same straight line.

The toolbar area (110) may additionally comprise additional function icons (112). Their number and the functions assigned to the icons (112) depend on the type of the application executed using the toolbar (100).

The main element (120) is implemented with the option of creation of a radial menu comprising a set of items (101-105) implemented with the option of scrolling in an arc-shaped trajectory. The number of radial interface items (101-105) is limited only by potential display of the elements of the application managed by the toolbar (100), which may comprise files, folders, application/device functions, etc.

The preferred method of device management using the claimed toolbar is using the toolbar on a touchscreen. If the toolbar (100) is operated on devices without a touchscreen managed with such devices as a mouse, trackball, joystick or touchpad, the radial interface scrolling area additionally comprises functional buttons (106, 107) for scrolling through.

The internal area of the main element (120) may show an executed application icon. The element area (120) also comprises the external area (121), which may show the application or device function execution status, for example, the progress of file transfer via a data network or an application loading process.

The information display/typing area (111) enables to execute the text typing function, for example, to use a search box for web search or number search in the phonebook memory, etc. This area can be also used for displaying uneditable data, for example, displaying the command executed by the application, displaying an SMS as running letters, etc.

Each of the additional elements (106, 107) can be assigned an individual application function to be executed through user interaction with the above elements (106, 107). The functions can be executed by interacting with each of the additional elements (106, 107), as well as by moving the main element (120) to the additional elements (106, 107) location.

The main element (120) can be used for executing functions by tapping on it or by holding the central area of the element (120), or by a series of short pressings (double click/pressing, triple pressing, etc.) to be preset as toolbar (100) commands.

Under the main bar/area (110) there is a popup window (130) for display of the application managed using the toolbar (100). FIG. 1 shows as example an SMS management application window; the window (130) enables to display received/sent messages, to create and re-address messages. The popup window (130) displays the application selected using the toolbar (100) in a downscaled format, i.e. it occupies the display area below the bar (110) and provides for a quicker application switching. When the radial interface functional elements (101-105) are enabled, the respective enabled application can be displayed in the window (130), if supported.

When the toolbar (100) is generated on a user device, the functional parameters of the application to be managed using the toolbar (100) are estimated, and the application functions are allocated among the functional elements (101-105, 108, 109, 111, 112, 120) of the toolbar (100).

Figure 2:
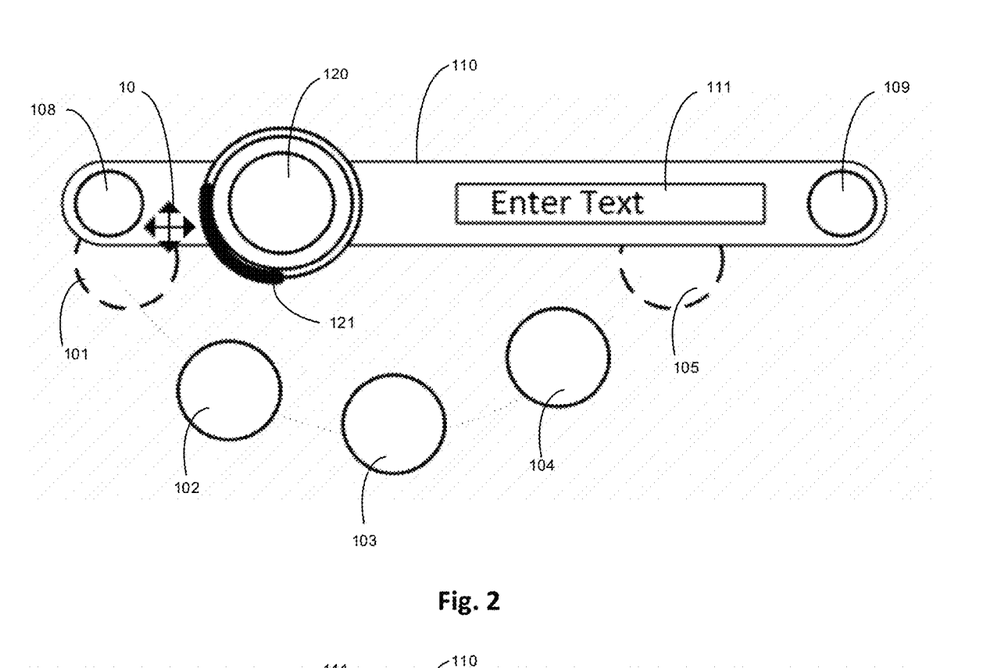
FIG. 2-FIG. 3 show the toolbar view when the toolbar area is moved across the display area.
Figure 3:
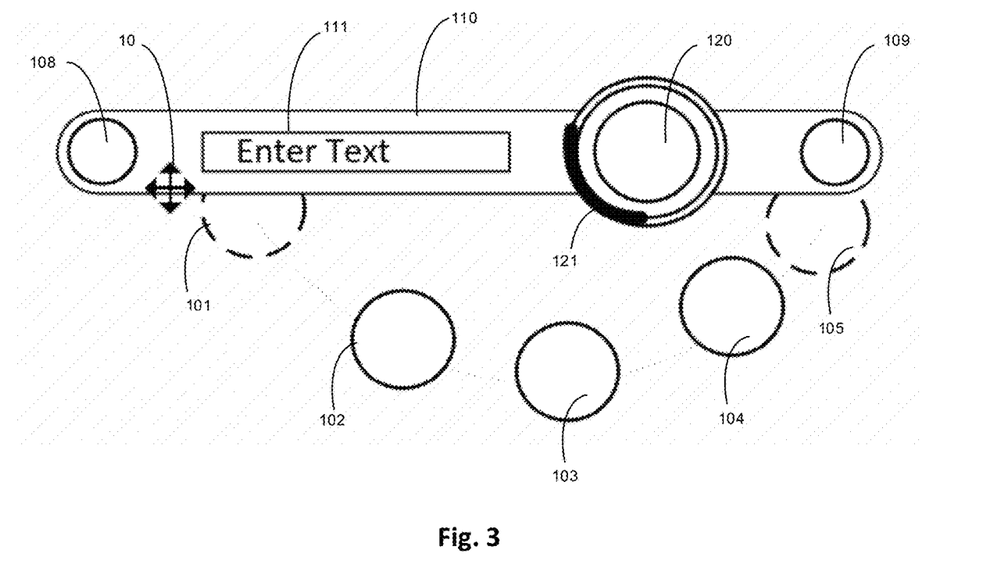

FIG. 2-FIG. 3 show an example of toolbar area (110) movement across the device display area by holding the bar/area (110) and dragging it by user input (10). The display part and its boundaries may impact the toolbar (100) view. FIG. 2 shows an example, when the toolbar (100) is moved to the upper display area, and in this case the radial interface elements (101-105) are displayed under the bar (110). When display of the popup window (130) is enabled, the radial interface elements (101-105) are minimized. Switching between the display modes can be performed using the functional elements/buttons (108, 109, 120).

FIG. 3 shows an example of the toolbar (100) view, when the device display side, next to which the toolbar (100) is located, is changed. The main functional element (120) can change its standard location on the bar (110) of toolbar (100).

Figure 4:
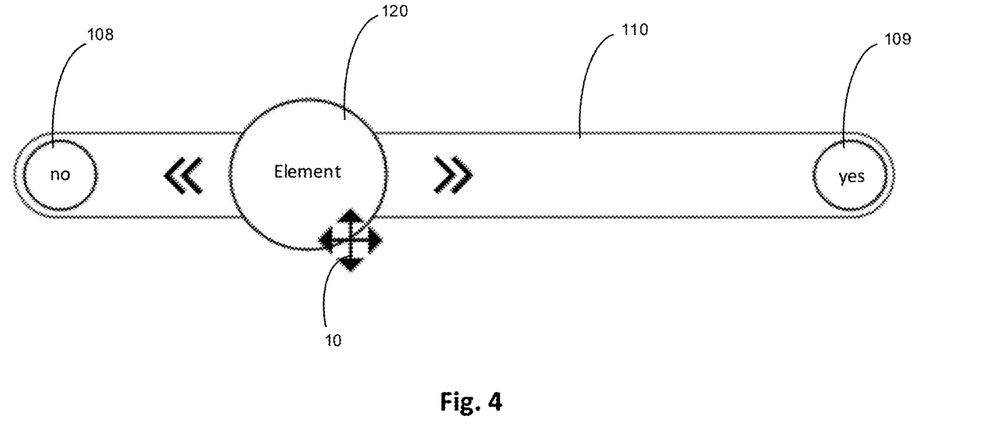
FIG. 4-FIG. 5 show application function enabling by moving the main toolbar element.
Figure 5:
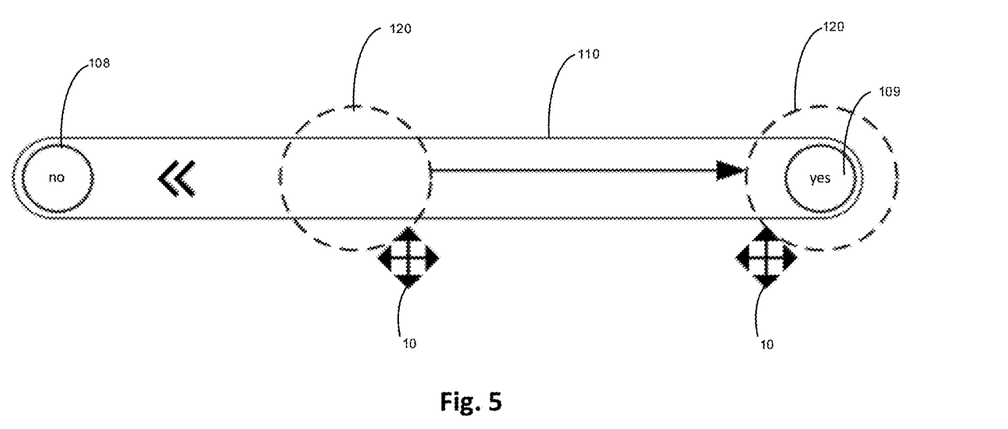

According to FIG. 4, application functions can be executed by dragging the main element (120) to an additional element (108, 109) area. By way of example, these areas (108, 109) can comprise the variants of taking the positive or the negative decision. According to FIG. 5, when a user command (10) for holding the element (120) and moving it to the destination point, in particular, the element (109) area, is received, the function assigned to the area (109) is determined and executed.

Figure 6:
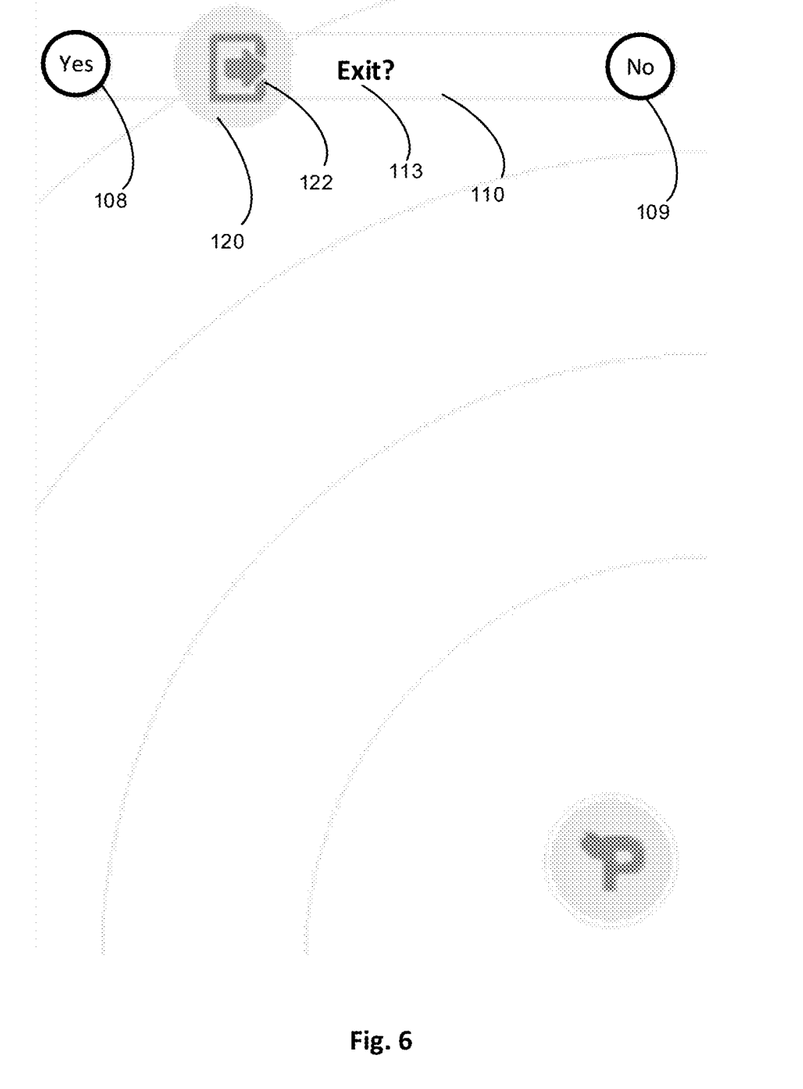
FIG. 6-FIG. 7 show an interface screenshot with a toolbar operation example.

FIG. 6 shows an example of claimed toolbar (100) use for application exit. The internal area (122) of the main element (120) shows the application function icon. When the element (120) is dragged to the required additional element (108, 109) area, the function assigned to the element is executed. The field (113) shows the information related to the specific application status and a set of available functions allocated among the element areas (108, 109, 120).

Figure 7:
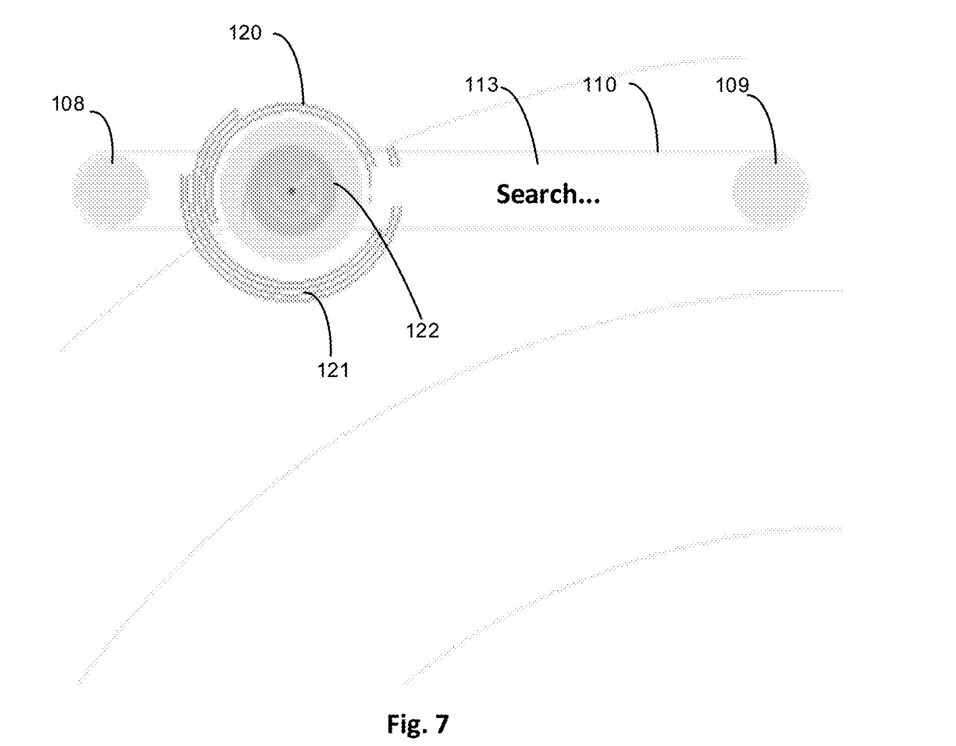

FIG. 7 shows an example of the toolbar (100) with application/device function execution area display (121), in particular, when device search, for instance, using Bluetooth communication, is activated. The progress display area (121) can have various graphical forms, for example, semi-circles, solid lines, display of percent, time values, etc. When function execution requires a long period of time, the area (113) shows actual function execution information. The popup window (130) may perform dynamic display of the devices found in the course of the search.

Figure 8:
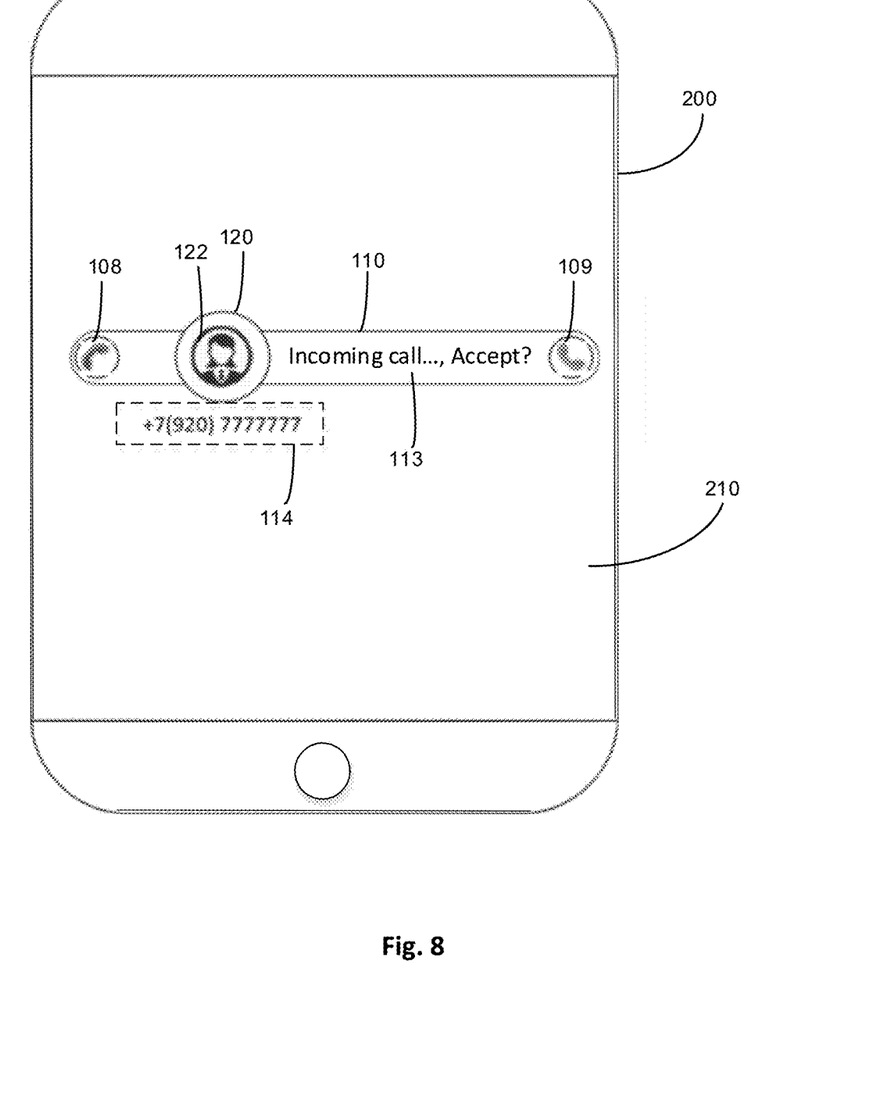
FIG. 8 shows an example of the toolbar when an incoming call is answered.

FIG. 8 shows an example of answering an incoming call on a mobile device (200) using the claimed toolbar (100). The main area/bar (110) can be preliminarily located in the required display area (210) of the device (200), or moved to any display area. The toolbar (100) is implemented with the scaling option and can dynamically change its scale when dragged to one or another part of the display area (210).

When answering an incoming call, the text area (113) shows a call notice or other data. The main element (120) can display identification data of the caller, in particular, his/her photo or name located in the internal area (122). Under the main element (120) there can be an area (114) displaying the caller telephone number. The additional elements (108, 109) have the functions for either declining (108) or answering (109) a call. Either mode is enabled by holding and dragging the main element (120) to the area of the additional element (108) or (109).

Pressing the main element (120) may enable display of additional application functions, for example, automatic sending of the set message type when the respective function is activated, or activation of video conferencing with the caller, etc. Furthermore, by interacting with the element (120), the popup window (130) can be activated in order to execute certain functions when operating an application using the toolbar (100).

Figure 9:
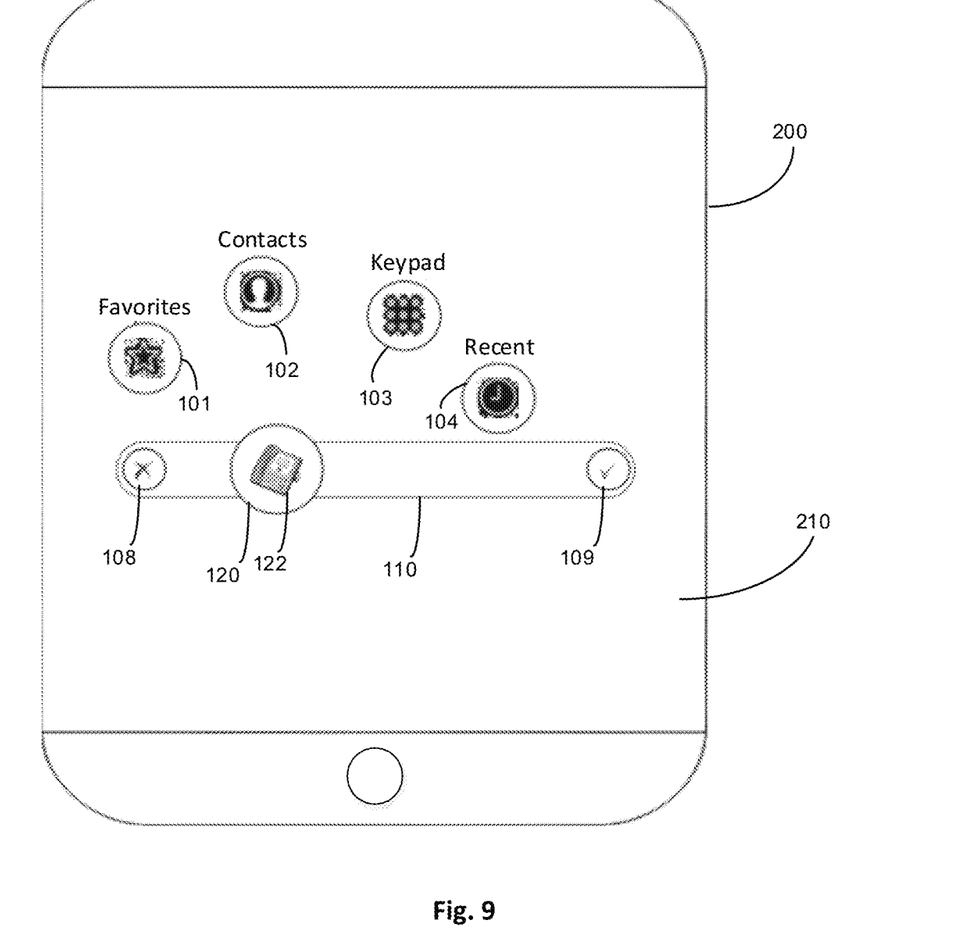
FIG. 9 shows an example of the toolbar with a radial interface.

FIG. 9 shows an example of the toolbar (100) when an application is managed for making calls. Interaction with the main element (120) can generate a radial menu with a set of functional elements (101-104) for execution of various functions, for example, display of selected number (101), the contact list (102), the dial keys (103), and the last calls (104).

Figure 10:
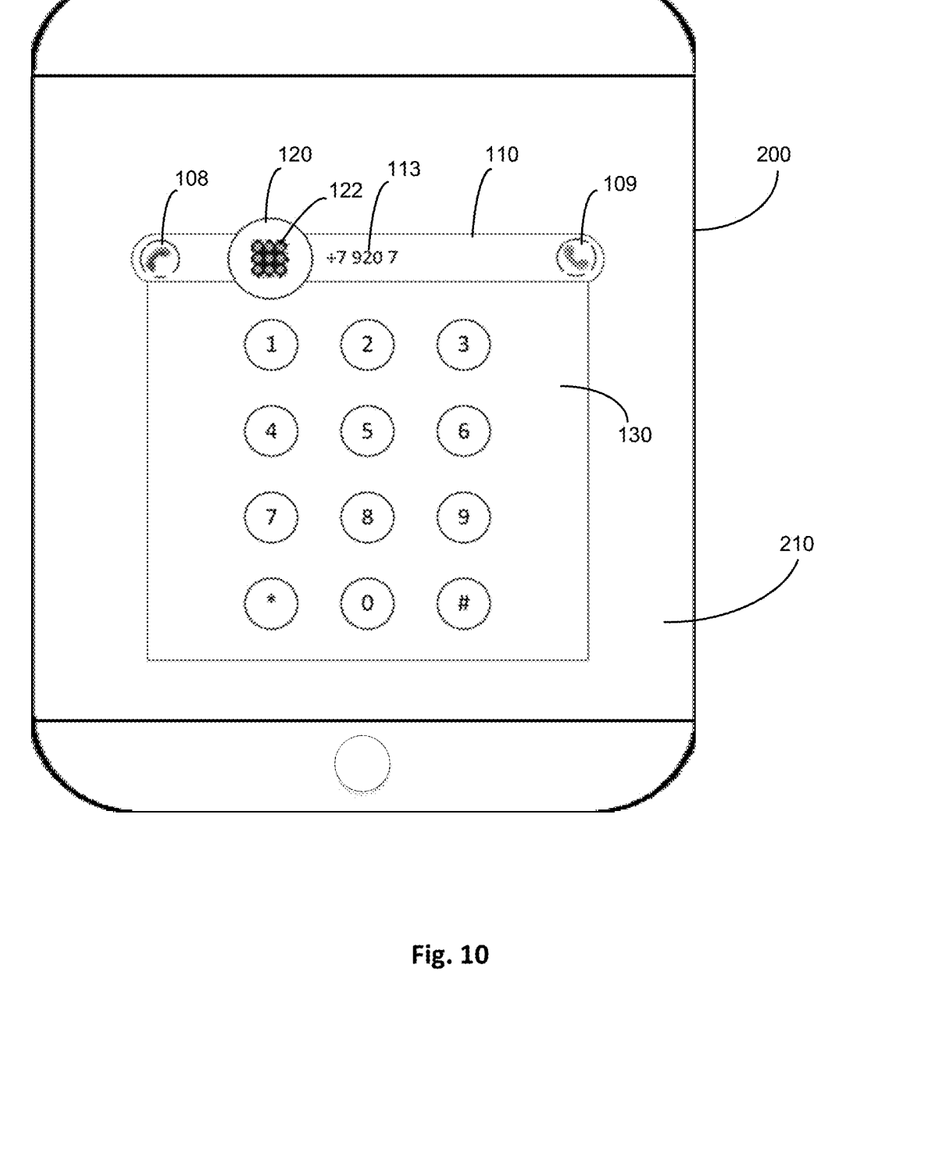
FIG. 10 shows an example of the device for the claimed toolbar embodiment.

FIG. 10 shows an example of dialing a number using the claimed toolbar (100). When the element (103) is selected for typing, it becomes the main element (120) and shows the keyboard in the area (130). The number being dialed is displayed in the field (113) of the toolbar (100). Making a call is possible by interacting with the respective additional element (109) or be dragging the main element (120) to the additional element (109) display area.

Figure 11:
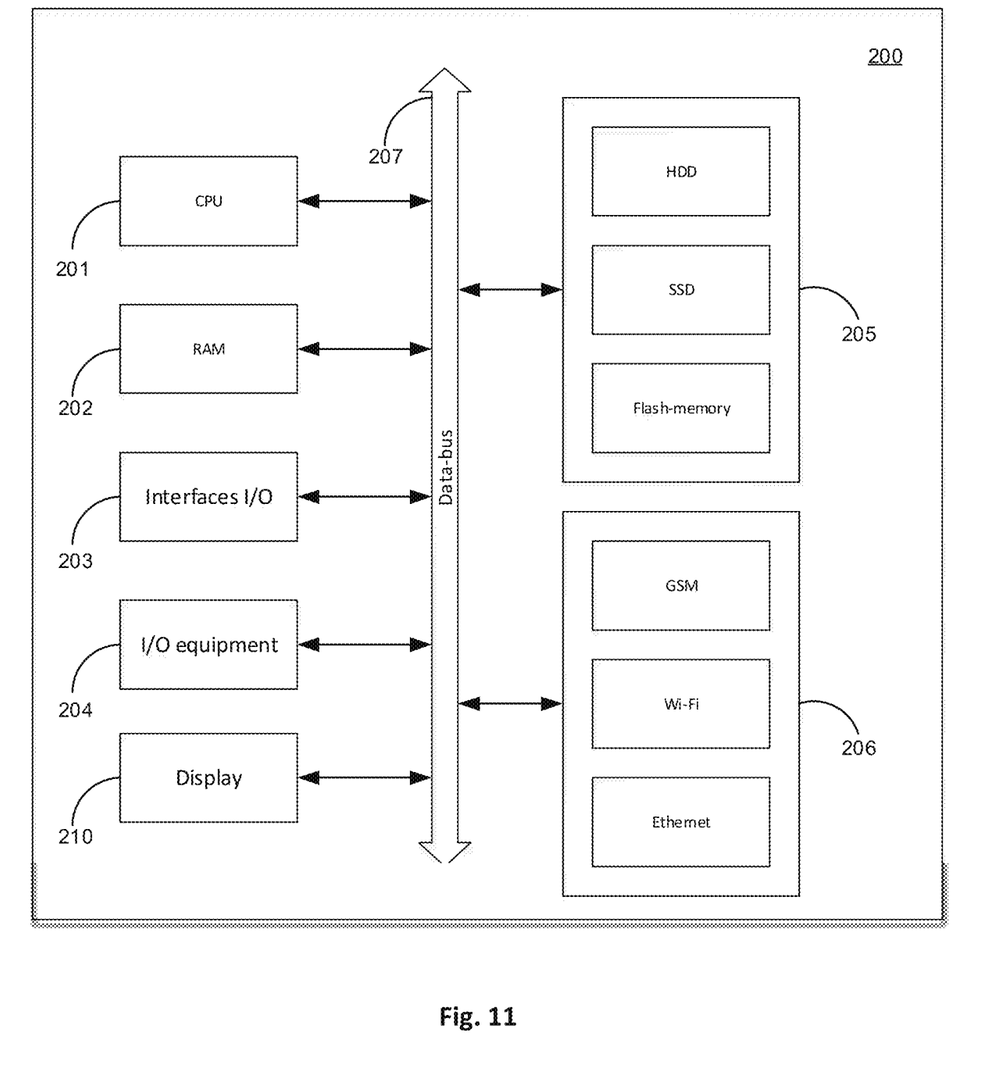
FIG. 11 shows an example of embodiment of the electronic device that can be controlled with a use of the claimed tollbar.

FIG. 11 shows the general appearance of a device (200) suitable for the implementation of a hardware/firmware system enabling display of the toolbar (100) on the electronic device (200) display (210) and execution its management functions.

The electronic device (200) can be presented by a smartphone, personal computer, tablet, phablet, laptop, etc. The device (200) can be represented by a remote server and generate display of a GUI managed using the claimed toolbar (100) on thin clients of the users.

The approximate embodiment of the electronic device (200) normally comprises one or more processors (201), a random-access memory (RAM) (202), various I/O interfaces (I/O) (203), I/O equipment (204), one or more data storage facilities (205), and one or more data transfer facilities (206) connected by the common data bus (207).

The I/O interfaces (203) can be selected from the following group: USB, micro-USB, Lightning, USB-C, PS/2, LPT, COM, etc.

The I/O equipment (204) can be represented by a joystick, a mouse, a keyboard, a touchscreen, a display, a screen, a projector, a touchpad, a trackball, a light pen, speakers, etc.

The data storage facilities (205) can be represented by HDD, SSD discs, a Flash memory (NAND, EEPROM, SD card), and optical drives (a CD, a DVD Rom, a Blue-Ray disk).

The data transfer facilities (206) can be represented by various devices and modules designed for wire or wireless data transfer from one to another device (200), in particular, a Wi-Fi module, an NFC module, an Ethernet module, a Bluetooth module, a GSM module (2G, 3G, 4G, 5G), etc. p The device (200) in conjunction with an embodiment of the toolbar (100) generation method and its use for managing the device (200) software environment form a system providing for creation of a new GUI management type, which ensures a new, quicker method of managing functions of a wide range of electronic devices.

A method for creation of the toolbar (100) for device (200) management can be implemented as a set of commands executed by the processor and stored on a machine-readable medium, providing for all required GUI management functions described above.

The preferred examples of claimed solution embodiment presented herein should not be used as limiting other embodiments within the scope of the requested legal protection.

The invention claimed is:

1. A method for controlling functions of an electronic device using a graphical user interface, the method comprising:

forming an area of a dynamic context toolbar comprising plural functional elements including a primary functional element for an application and two supplementary functional elements for activating different functions within the application, wherein centers of the primary functional element and the two supplementary functional elements are positioned on a straight line, wherein the plural functional elements are concurrently displayed on a display screen of the electronic device, wherein each of the plural functional elements is configured to enable user input provided in connection with a function that is dynamically assigned to a respective functional element of the plural functional elements;

displaying, for each of the plural functional elements, a corresponding icon, wherein the corresponding icon for the primary functional element is displayed over an increased area relative to either icon for the two supplementary functional elements, wherein the corresponding icon for the primary functional element relates to an executed application icon for the application that the dynamic context toolbar is currently associated with;

while the primary and supplementary functional elements are maintained in terms of number and type regardless of a current context and a current application being run, dynamically assigning functions to the plural functional elements based on the current context and the current application being run, the assigned functions being dynamically re-assignable when there is a change to at least one of the current context or the current application being run, wherein the area of the dynamic context toolbar is formable, and the functions are assignable to the plural functional elements, in response to a prompt for user interaction, wherein functions that are assigned to the two supplementary functional elements are for the current application being run, and wherein the dynamically assigned functions for the two supplementary functional elements are for opposing actions to take within current context and the current application being run;

receiving, via the toolbar, user control commands for the current application being run; and executing at least one application function via interaction of a user with the primary functional element and in dependence on the assigned functions.

2. The method according to claim 1, wherein the dynamic context toolbar further comprises a text typing area.

3. The method according to claim 1, wherein the dynamic context toolbar further comprises an application information display area.

4. The method according to claim 3, wherein the application information display area is configured to display the application at a reduced scale.

5. The method according to claim 1, wherein the dynamic context toolbar area is configured to be movable on the graphical user interface.

6. The method according to claim 1, wherein activation of an application function is performed by holding and dragging the primary functional element to a location area of one of the two supplementary functional elements.

7. The method according to claim 1, wherein upon activation of the primary functional element, a radial interface is generated that displays a set of applications and/or functions of the electronic device, said applications and/or functions being configured to be scrolled along an arc-shaped trajectory relative to where the primary functional element is positioned, wherein the set of applications and/or functions is based on the current context and the current application being run.

8. The method according to claim 1, wherein the primary functional element further comprises an executed function status or a progress display area for the application.

9. A non-transitory machine-readable medium comprising machine-readable instructions, which, when executed by at least one processor, implement the method as claimed in claim 1.

10. The method according to claim 1, wherein a manner with which the primary functional element is manipulable is variable based on the current application and current context, and wherein the primary functional element is assigned at least one function that is not variable based on the current application and current context.

11. The method according to claim 10, wherein upon activation of the primary functional element, a radial interface is generated that displays a context-dependent set of further elements for activating further applications and/or functions of the device, wherein the context-dependent set of further elements is scrollable along an arc-shaped trajectory relative to where the primary functional element is positioned, wherein the arc-shaped trajectory is arranged relative to the primary functional element, based on location of the dynamic context toolbar relative to edges of a display on which the dynamic context toolbar is displayed, and wherein the dynamic context toolbar is movable on the display.

12. The method according to claim 1, wherein a manner with which the primary functional element is manipulable is variable based on the current application and current context, wherein the primary functional element has a type that is not variable based on the current application and current context, and wherein only control elements in the dynamic context toolbar are the primary functional element and the two supplementary functional elements.

13. The method according to claim 1, wherein one prompt for user interaction responsive to which the area of the dynamic context toolbar is formed and the functions are assigned to the elements relates to an incoming phone call.

14. A system for electronic device functions management using a graphical user interface, comprising:

at least one processor; and at least one memory with machine-readable instructions, which, when executed by the at least one processor, form an area of a dynamic context toolbar comprising plural functional elements including a primary functional element for an application and two supplementary functional elements for activating different functions within the application, wherein centers of the primary functional element and the two supplementary functional elements are positioned on a straight line, wherein the plural functional elements are concurrently displayed on a display screen of the electronic device, wherein each of the plural functional elements is configured to enable user input provided in connection with a function that is dynamically assigned to a respective functional element of the plural functional elements;

display, for each of the plural functional elements, a corresponding icon, wherein the corresponding icon for the primary functional element is larger than either icon for the two supplementary functional elements, wherein the corresponding icon for the primary functional element corresponds to an executed application for the application that the dynamic context toolbar is currently associated with;

while the primary and supplementary functional elements are maintained in terms of number and type regardless of a current context and a current application being run, dynamically assign functions to the plural functional elements based on the current context and the current application being run, the assigned functions being dynamically re-assignable when there is a change to at least one of the current context or the current application being run, wherein the area of the dynamic context toolbar is formable, and the functions are assignable to the plural functional elements, in response to a prompt for user interaction, wherein functions that are assigned to the two supplementary functional elements are for the current application being run, and wherein the dynamically assigned functions for the two supplementary functional elements are for opposing actions to take that are dependent on the current context and the current application being run;

receive, via the dynamic context toolbar, control commands for the current application being run; and execute at least one application function via interaction of a user with the primary functional element and in dependence on the assigned functions.

15. The system according to claim 14, wherein the dynamic context toolbar further comprises an application information display area.

16. The system according to claim 15, wherein the application information display area is configured to display the application at a reduced scale.

17. The system according to claim 14, wherein the dynamic context toolbar is configured to be movable on the graphical user interface.

18. The system according to claim 14, wherein activation of an application function is performed by holding and dragging the primary functional element to a location area of one of the supplementary functional elements.

19. The system according to claim 14, wherein upon activation of the primary functional element, a radial interface is generated that displays a set of applications and/or functions of the electronic device, said applications and/or functions being configured to be scrolled along an arc-shaped trajectory relative to where the primary functional element is positioned, wherein the set of applications and/or functions is based on the current context and the current application being run.

20. The system according to claim 14, wherein the primary functional element further comprises executed function status or a progress display area for the application.

* * * * *